United States Patent [19]

Chevalier et al.

[11] 4,386,687

[45] Jun. 7, 1983

[54] ELECTRONIC DEVICE CONTROLLING THE BRIDGING OR LOCKING OF A HYDRODYNAMIC TORQUE CONVERTER AND METHOD OF APPLICATION

[75] Inventors: Claude Chevalier, Jouars-Pontchartrain; Gino Zammarchi, Paris; Jean M. Bouvet, Boulogne-Billancourt, all of France

[73] Assignee: Regie Nationale des Usines Renault, France

[21] Appl. No.: 158,674

[22] Filed: Jun. 12, 1980

[30] Foreign Application Priority Data

Jun. 13, 1979 [FR] France .................................. 79 15192

[51] Int. Cl.³ ...................... F16D 25/12; B60K 41/02; B60K 41/28
[52] U.S. Cl. .................................. 192/3.3; 192/0.033; 192/3.31
[58] Field of Search ...................... 192/3.3, 3.29, 3.31, 192/0.033

[56] References Cited

U.S. PATENT DOCUMENTS

| 3,073,183 | 1/1963 | Kelley | 192/3.3 X |
| 3,126,988 | 3/1964 | Memmer | 192/3.3 |
| 3,403,587 | 10/1968 | Castelet | 74/866 |
| 3,857,302 | 12/1974 | Morris | 192/3.3 X |
| 4,033,202 | 7/1977 | Ahlen et al. | 192/3.31 X |
| 4,049,094 | 9/1977 | Polomski et al. | 192/3.31 |
| 4,056,177 | 11/1977 | Ahlen et al. | 192/3.3 |
| 4,236,617 | 12/1980 | Whateley | 192/3.3 |
| 4,270,636 | 6/1981 | Sunohara et al. | 192/3.31 |

Primary Examiner—Rodney H. Bonck
Attorney, Agent, or Firm—Beveridge, De Grandi & Kline

[57] ABSTRACT

The device consists of a comparison unit 35 comparing the respective speeds 31a and 32a of the input shaft 2 and the output shaft 7 of the converter with a pre-set value so as to supply a "bridging" control command to an electrohydraulic transducer 14; and a timing unit 34 eliminating the "bridging" by signal 34a during the changeover from one transmission ratio to another in accordance with the data supplied by the unit 20 and transmitting with a delay the changeover control command to the transmission control elements 13a and 13b. It is thus possible to "bridge" or lock out the converter for all the transmission ratios while eliminating the "bridging" when each ratio change is made.

12 Claims, 7 Drawing Figures

ELECTRONIC DEVICE CONTROLLING THE BRIDGING OR LOCKING OF A HYDRODYNAMIC TORQUE CONVERTER AND METHOD OF APPLICATION

The present invention due to the collaboration of Messieurs Claude CHEVALIER, Gino ZAMMARCHI and Jean-Marie BOUVET concerns an electronic device for controlling the "bridging" or by-passing system which permits slipless coupling between the input shaft and the output shaft of a hydrodynamic torque converter forming part of an automatic transmission for an engine drive unit, for example of an automotive vehicle. The invention's electronic control device enables locking or "bridging" to be achieved for all transmission ratios.

Automatic transmissions used in automotive vehicles comprise a hydrokinetic torque converter positioned between the vehicle drive engine and the gearbox. The principal role of this torque converter is to multiply the input torque supplied by the engine by a certain factor during a transient so-called torque conversion phase. When this torque conversion phase is completed the torque converter has an adverse effect in practice. In fact a certain amount of slippage remains between the rotating input and output elements of the converter and this reduces the overall efficiency of the engine drive unit and thus increases its fuel consumption.

Therefore, in order to cut down on the automotive vehicle's fuel consumption, in the case of this type of automatic torque converter transmission, the input and output components should be locked together as soon as the conversion or changeover phase is over so that slippage is eliminated. This operation is here referred to as "bridging".

Electrohydraulic devices enabling such a torque converter to be "bridged" have already been proposed. Certain known devices, however, only perform "bridging" on the highest speed ratio which, in most cases, only leads to a negligeable gain in fuel consumption. Other devices of known type only perform the "bridging" on the basis of a single parameter, the converter output speed, which parameter is not representative enough of the true operation of the converter. Finally other known devices have the drawback that the "bridging" continues during gear changes which causes operating shocks and detracts from ease of shift and reduces the life of certain components in the automatic transmission.

This invention concerns an electronic control device enabling "bridging" to be carried out for all transmission speed ratios whilst still temporarily interrupting the "bridging" effect when each speed change takes place.

Further, the invention concerns a device enabling the "bridging" system to be controlled on the basis of the true converter operating parameters formed by the input shaft speed or engine speed along with the output shaft or turbine speed, the electronic device of the invention comparing the ratio of these speeds with a pre-set value corresponding to the converter's theoretical coupling point.

The present invention also concerns a method for "bridging" a hydrodynamic torque converter forming part of an automatic transmission with several transmission ratios in which "bridging" is actuated for all the transmission ratios as soon as the ratio between the converter output shaft speed and the input shaft speed ($V_T/V_M$) exceeds a limiting value corresponding roughly to the converter coupling point. For each change from one transmission ratio to another ratio "bridging" is preferably eliminated during a pre-set period of time. In addition, the transmission ratio change command is then only supplied to the automatic transmission when this pre-set time has expired.

According to the invention the electronic "bridging" control device providing for non-slip coupling between the input shaft and the output shaft of a hydrodynamic torque converter forming part of an automatic transmission with several transmission ratios comprises a comparison unit comparing the respective speeds of the input and output shafts of the converter with a pre-set value in order to supply a "bridging" control command. In addition the device consists of a timing unit which eliminates the "bridging" during the changeover from one transmission ratio to another ratio and transmits the command controlling the changeover from one transmission ratio to another with a delay.

In a preferred embodiment of the invention the timing unit comprises, for each transmission ratio change signal, a device generating a pulse of pre-set duration on each change in condition of the changeover signal and also a memory system receiving the changeover signal and only transmitting it after the above-mentioned pre-set duration is ended.

In a first embodiment the comparison unit comprises a frequency/voltage converter for each of the signals representing respectively the input shaft speed $V_M$ and the output shaft speed $V_T$ of the converter, and a comparator receiving the whole of one of the voltages obtained and a fraction of the other voltage. The comparison unit thus provides a signal when the ratio between the input and output speeds $V_T/V_M$ exceeds a pre-determined limiting value corresponding to the converter coupling point.

In another preferred embodiment providing a faster response, the comparison unit comprises, for the signal representing the input shaft speed, a frequency/voltage converter as above, but also, for the signal representing the output shaft speed, a period meter which also receives the current from a current generator controlled by the output signal from the above-mentioned frequency/voltage converter. In this way the comparison unit also supplies an output signal every time the input and output speed ratio $V_T/V_M$ *is higher than the said pre-set value.*

In addition it is advantageous for the comparison unit to comprise a safety circuit receiving the voltage signal corresponding to the input shaft speed so as to prohibit "bridging" below a lower input shaft speed limit which is also the engine speed.

The output signal of the electronic control device of the invention corresponding to a "bridging" command for the converter is supplied by an AND logic gate which receives: the pre-set time pulses emitted after inversion by the timing unit; the signal from the period meter or from the comparator comparing the respective input and output speeds; along with any inverted output signal from the safety circuit. If the automatic transmission also comprises a reverse drive ratio the AND gate also receives a signal corresponding to the rear drive condition of the transmission so as prevent any "bridging" in this position.

The preferred application of the electronic control device of the invention consists in combining this device with an electrohydraulic transducer controlled by the electronic device of the invention and placed in the torque converter hydraulic feed circuit, below it, with a restrictor additionally being fitted in parallel with the said transducer. When the electrohydraulic transducer electrovalve is opened the pressure drops inside the converter enclosure. The converter preferably comprises a hydraulic valve fitted in the hydraulic fluid circuit feeding the converter enclosure or casing which is controlled by the pressure obtaining in the said enclosure in such a way as to selectively feed either the converter enclosure or a chamber releasing a piston controlling a clutch capable of performing the "bridging" between the converter input shaft and output shaft.

Better understanding of the invention will be gained by studying the detailed description of a few embodiments taken only as non-exclusive examples and illustrated with the appended drawings in which.

Figure 1:
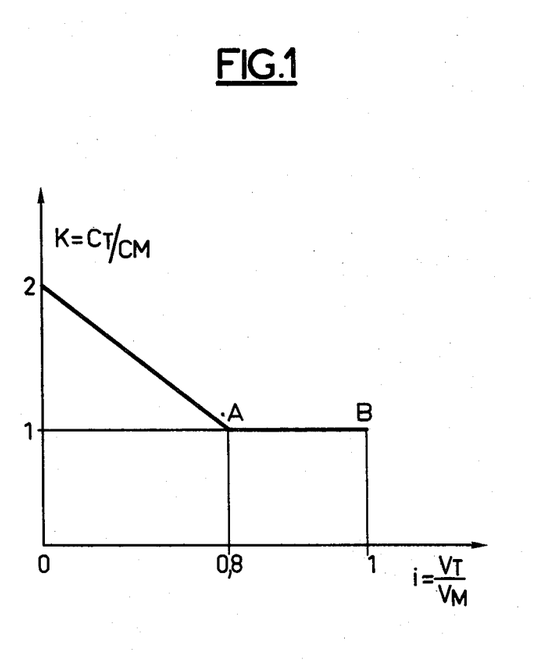
FIG. 1 shows a graph of the variation of the torque multiplier factor against the output speed or turbine speed/input speed or engine speed ratio of a torque converter used in an automatic transmission.

As shown on the graph in FIG. 1, the multiplication factor $K = C_T/C_M$ of the input torque to an automotive vehicle automatic transmission hydraulic converter varies with the ratio $i = V_T/V_M$ between the output speed or turbine speed and the input speed or engine speed. Factor K reaches its lowest value equal to one at the theoretical coupling point A. There then remains between the converter input shaft and output shaft slippage which is represented by segment A,B. When the ratio i remains less than the value corresponding to point A, i.e. about 0.8 in practice, the converter works in the torque conversion mode. When, on the other hand, the ratio i lies between this approximate value of 0.8 and one the converter lies within the coupling zone. The stator rotates at the same time as the turbine through a freewheel system, the converter then being changed into a simple coupling. It is possible to improve the overall efficiency of the automatic transmission by eliminating any slippage beyond the theoretical coupling point A.

Since it is easier using usual engineering techniques to measure a rotary speed than to measure a torque, the speed ratio i at the A coupling point value is used in preference for controlling the "bridging" operation.

If the speed of the converter output shaft, i.e. the speed of rotation of the turbine is $V_T$ and the speed of rotation of the input shaft or engine speed is $V_M$, "bridging" should occur when the ratio $i = V_T/V_M$ exceeds the limiting value corresponding to point A, i.e. in practice about 0.8. Therefore the electronic control device of the invention is designed to perform the function $V_T - i \times V_M > 0$.

Figure 2:
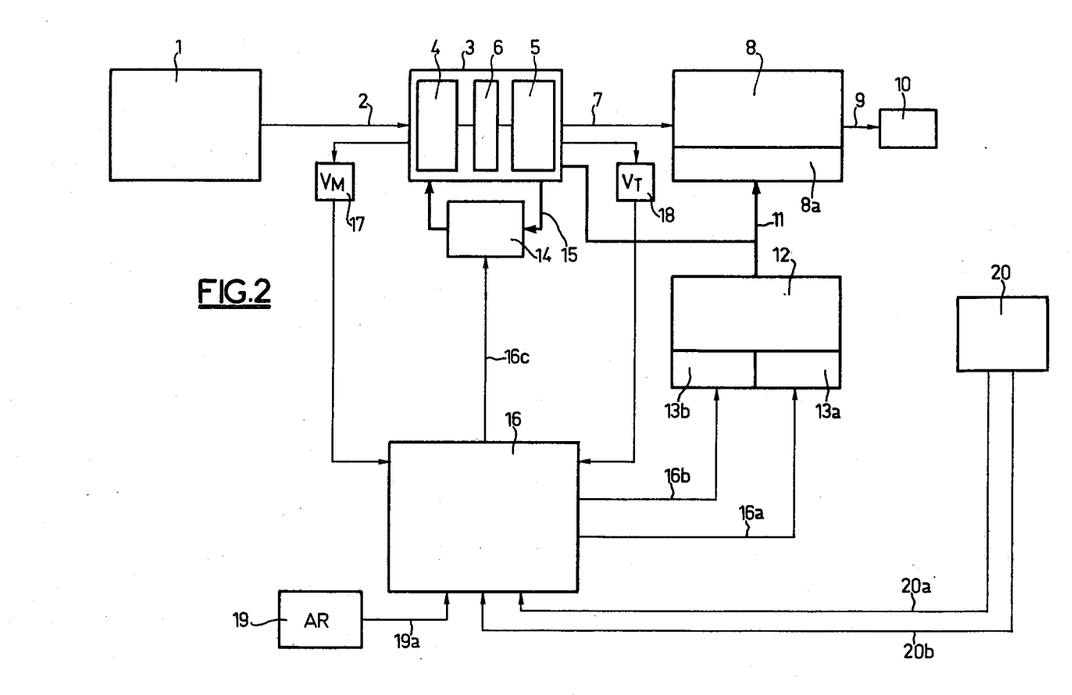
FIG. 2 shows schematically the whole of an automatic transmission mechanism for automotive vehicle fitted with an electronic converter "bridging" control device according to the present invention.

As shown in FIG. 2 the automatic transmission assembly using the electronic control device of the invention comprises an internal combustion engine (1) coupled mechanically via an input shaft (2) to hydrokinetic torque converter (3) comprising an input element or impeller (4), an output element or turbine (5) and a central element or stator (6). The turbine (5) is itself connected mechanically through an output shaft (7) to an automatic transmission (8) comprising for example an epicyclic gear train having several ratios along with friction components actuated hydraulically and represented schematically by block 8a. The mechanical output (9) from the transmission (8) drives the vehicle represented by block 10.

The hydraulic friction elements (8a) are fed with hydraulic fluid under pressure by the duct (11) connected to a hydraulic power unit (12) comprising a set of hydraulic valves controlled by electrohydraulic transducers (13a and 13b) making it possible to select, according to their state, a required speed ratio for the automatic transmission (8).

A hydraulic transducer (14) supplied with hydraulic fluid by a duct (15) is also connected to the enclosure or casing of the converter (3). The electrohydraulic transducer (14) is controlled by the converter "bridging" electronic control device (16) of the invention. When it is actuated the electrohydraulic transducer (14) locks together the converter (3) input and output components, i.e. the impeller (4) and the turbine (5), thus eliminating any slippage between the input shaft (2) and the output shaft (7) of the converter.

The electronic control device (16) receives, in the example illustrated, several parameters or data on the drive conditions of the automotive vehicle. The first of these data supplied by a sensor (17) represents the rotational speed $V_M$ of the input shaft (2) or, which comes to the same, of the input component (4) or impeller which is itself connected directly to the engine (1). The second item of data supplied by sensor (18) represents the rotational speed $V_T$ of the converter output shaft (7) or, which comes to the same, the rotational speed of the output component or turbine (5) of the converter (3).

The third item of data supplied by an element (19) working in conjunction with the manual transmission control lever consists of a control command intended to place the transmission in the state corresponding to the reverse drive ratio. Finally, two other data labelled 20a and 20b which are electric gear changeover commands are supplied by an electronic governor device (20) of conventional construction.

After these various input data have been processed the electronic control unit (16) supplies electrical control commands (16a and 16b) to the electrohydraulic transducers (13a and 13b) which select a required speed ratio along with an electric control command (16c) to the "bridging" electrohydraulic transducer (14). The construction of the electronic "bridging" device (16) is such that for every speed change controlled by a specific combination of signals 20a and 20b, it first of all supplies a control command (16c) to the electrohydraulic transducer 14 in such a manner as to eliminate the "bridging" configuration and put the converter into the torque conversion phase. Only when this operation has been completed does the electronic control device (16)

send the gear change commands 20a and 20b from the electronic device (20) to the electrohydraulic transducers (13a and 13b) by the signals 16a and 16b. After the gear change, and in accordance with the value of the ratio $V_T/V_M$ between the output speed determined by sensor 18 and the input speed determined by sensor 17, the electronic device (16) again controls the electrohydraulic transducer (14) so as carry out the "bridging" operation and again eliminate any slippage between the input shaft and the output shaft of the converter for the new transmission ratio.

"Bridging" is thus achieved in accordance with the true operating parameters of the converter for all the gear ratios of the automatic transmission (8) with, in addition, the "bridging" being interrupted at the time of the gear ratio changes.

Figure 3:
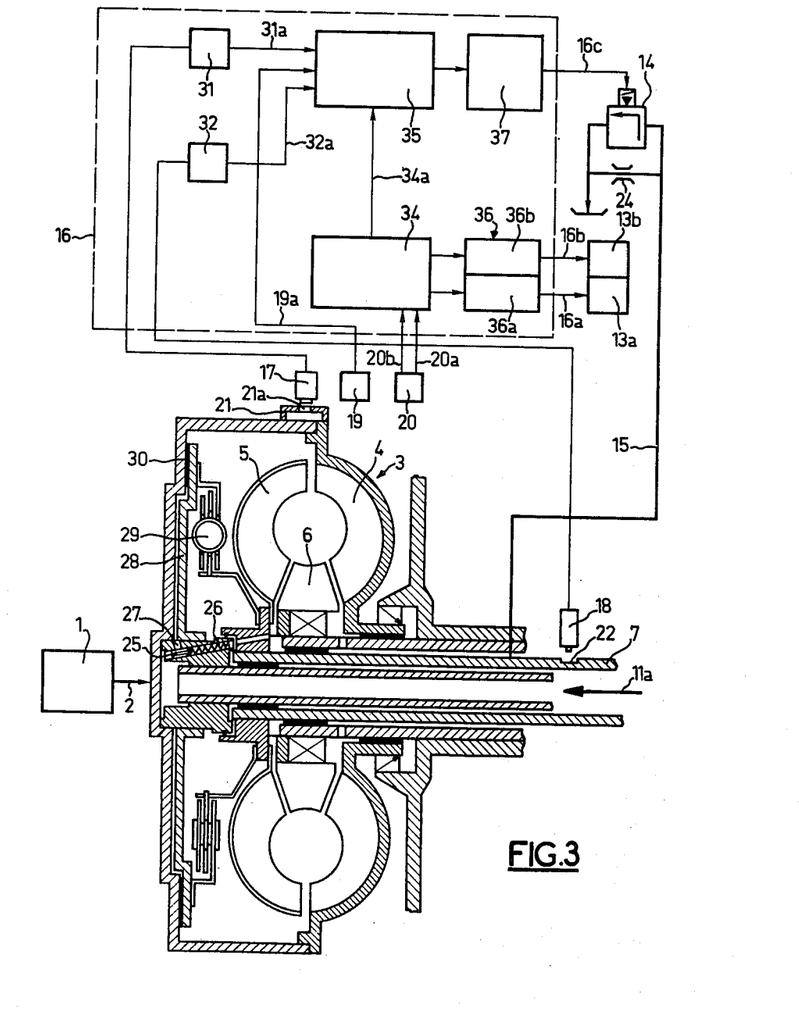
FIG. 3 shows in more detail the main components of the electronic control device of the invention applied to controlling the "bridging" of a torque converter and combined with an electrohydraulic "bridging" transducer.

The schematic diagram of FIG. 3, in which the components already described bear the same reference numbers, gives a more precise picture of the impeller or input component (4) of the converter (3) directly connected to the engine (1) via the shaft (2). The bell or toroid of the impeller (4) has a circular metal ring (21) round its edge in which equispaced slots (21a) are machined. These slots are sensed by the magnetic sensor (17) made in a manner that is known per se. The sensor (17) emits an electric signal whose frequency is therefore proportional to the speed of the input shaft (2) or the engine speed $V_M$. The converter output member or turbine (5) is connected to the output shaft (7) comprising equispaced slots (22) round its circumference and these are sensed by the magnetic sensor (18) made in a manner that is known per se and which may be similar to sensor 17. So sensor 18 emits a signal whose frequency is proportional to the rotational speed of the output shaft (7) or turbine speed $V_T$.

The hydraulic fluid is fed to the converter (3) via the duct (11a) passing through the centre of the central transmission shaft. The electrohydraulic transducer (14) fitted in the converter (3) hydraulic fluid feed circuit downstream of the converter provides, in the conversion phase when it is open and in conjunction with a restrictor (24) fitted in parallel with the transducer (14), a large flow in duct 15 which leads to a low pressure in the converter casing (3). Static equilibrium during this phase is such that the moving slide (25) of a hydraulic valve fitted in the hub of the converter (3) compresses its return spring (26) and thus frees a calibrated orifice (27). The pressure of the hydraulic feed fluid which then flows through the orifice (27) is then exerted on the rear end of the control piston (28) setting up a force which enables the said control piston (28) to be moved. The peripheral part of the piston (28) which comprises a lining (30) is then uncoupled from the bell of the impeller (4). The "bridging" previously operating between the impeller (4) and the turbine (5) via the torsional vibration damping member (29) therefore disappears.

In the "bridging" phase the electrohydraulic transducer (14) is closed, on the other hand, so that restrictor 24 alone determines a low flow rate in the duct (15). The pressure level in the closed casing or enclosure of the converter (3) reaches a high level. The static equilibrium of the assembly made up of the slide valve (25) and the spring (26) is then such that the slide valve (25) moves to block off the calibrated orifice (27). The high fluid pressure in the converter casing (3) leads to clamping action by the piston (28) through the lining (30) thus locking the impeller (4) connected to the engine (1) with the turbine (5) connected to the output shaft (7). In this position the slippage between the input component (4) and the output component (5) of the converter is eliminated: so "bridging" is achieved.

The main components of the electronic control device (16) have also been shown in FIG. 3. The electronic control device (16) comprises two identical processing units labelled 31 and 32 which, by a method known per se, shape the signals originating respectively from the engine speed sensor (17) and the turbine speed sensor (18). The signals 31a and 32a transmitted by units 31 and 32 are rectangular signals whose frequency is proportional respectively to the rotational speed $V_M$ of the input shaft and the rotational speed $V_T$ of the output shaft of the converter (3). The timing unit (34) is designed, on the basis of the electric speed change commands 20a and 20b, to take off the "bridge" by means of the "debridging" signal (34a) during gear changes and to transmit the gear or speed change commands with a certain delay to the electrohydraulic transducers (13a and 13b) via a control interface circuit labelled 36 for the whole unit and comprising two identical sub-units 36a and 36b.

The speed comparison unit 35 is an electronic circuit designed to compare the turbine speed/engine speed ratio with the value i respresenting the theoretical coupling point A in FIG. 1. The comparison unit 35 supplies a "bridging" order (16c) to the electrohydraulic transducer (14) via a power interface circuit (37).

Figure 4:
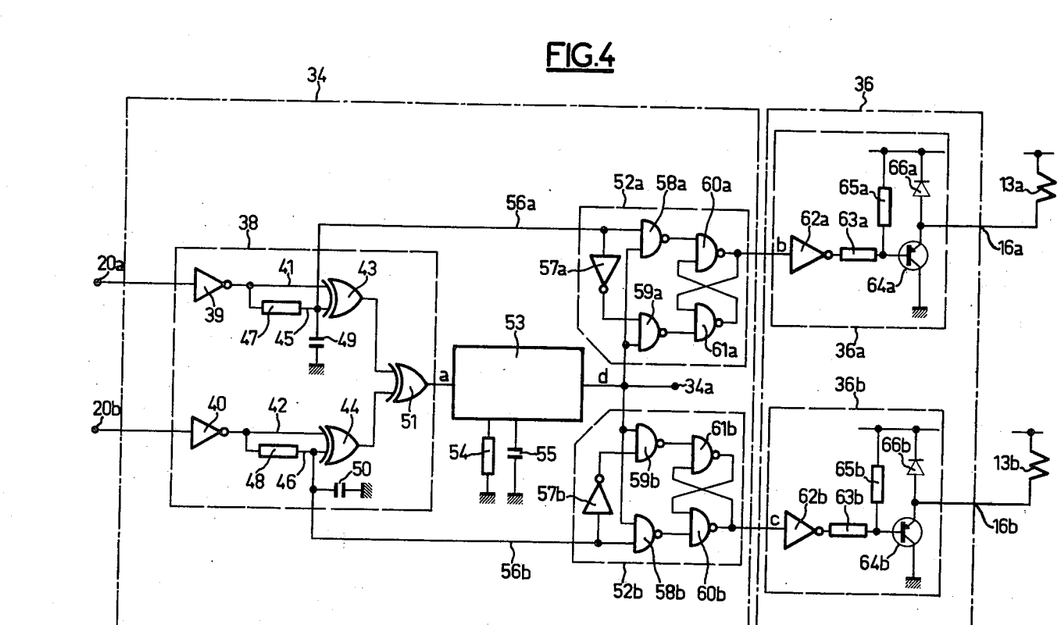
FIG. 4 shows schematically the timer unit of the electronic control device of the invention.

FIG. 4 shows schematically the basic elements of the timing unit (34) along with the those of the control interface unit (36).

The timing unit (34) has a twofold role. On the one hand it gives rise to a "debridging" command on terminal 34a every time an electric ratio change command appears through the change in state of one of signals 20a or 20b. In addition it delays the transmission of this electric ratio change command 20a or 20b to the electrohydraulic transducers 13a and 13b. Each change up or down in the gear ratio is therefore preceded by a "debridging" command.

Figure 5:
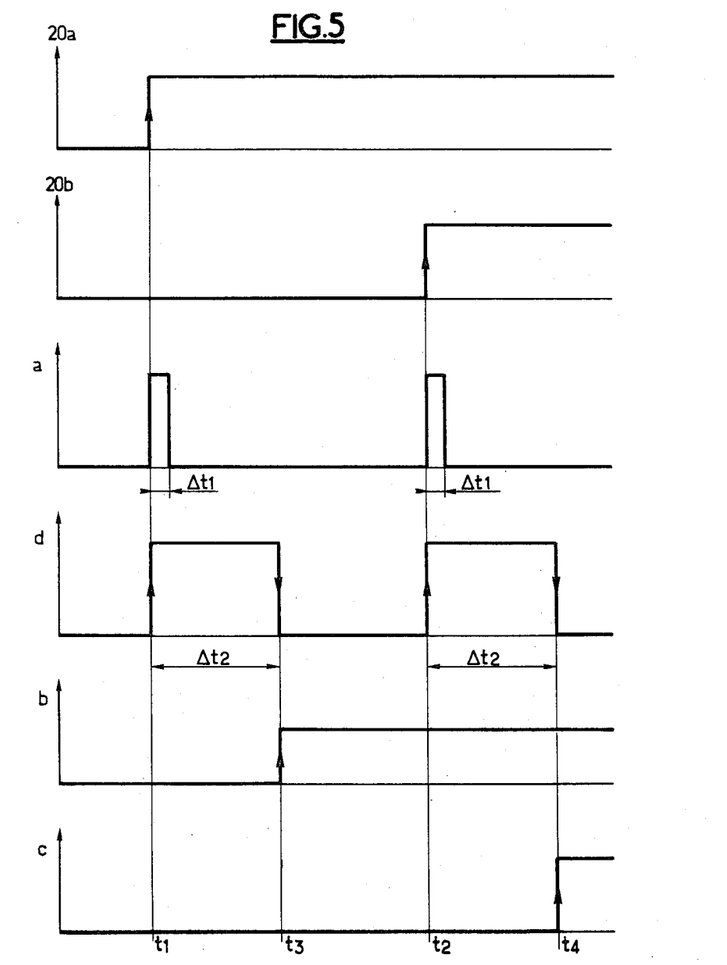
FIG. 5 shows the shape of the signals appearing at various points in the schematic in FIG. 4.

The electric gear change commands 20a and 20b possess logic levels the combination of which makes it possible in the illustrated example to obtain three forward drive ratios. For the first gear ratio the two signals are at the "zero" low level as shown in FIG. 5 up to time $t_1$. For the second gear ratio signal 20a is at the high level whilst signal 20b is at the low level as shown between $t_1$ and $t_2$. For the third gear ratio the two signals are at the high level as shown after $t_2$. The state change at time $t_1$ represents an electric command to change from the first transmission ratio up to the second ratio. The state change at time $t_2$ represents an electric order to change up from the second transmission ratio to the third ratio.

Circuit 38, which receives signals 20a and 20b, transmits an output signal a which can be seen in FIG. 5 and which enables each logic level transition of either of signals 20a or 20b to be converted into a control pulse lasting time $\Delta t_1$. Each signal 20a and 20b is received on an inverting amplifier (39 and 40). The output signal from this amplifier is applied to one of the inputs (41, 42) of a logic gate (43, 44) performing the "exclusive OR" function. The second input (45, 46) to the said logic gates 43 and 44 also receives the output signal from the inverting amplifier (39, 40) but with a time delay achieved by the circuit formed by resistors 47 and 48 and capacitors 49 and 50 connected to the mass or ground. The two output signals from logic gates 43 and 44 respectively are applied to the two inputs to a logic gate (51) which also performs the "exclusive OR" and supplies the output signal a.

It can be seen that by using this circuit, whenever there is a state change from the low level to the high level in one of signals 20a or 20b, the two inputs of one of the logic gates 43 or 44 are in a different state for a short time $\Delta t_1$ which depends on the value of resistors 47 and 48 and of capacitors 49 and 50. During this period the two inputs of the logic gate (51) are therefore also in a different state so that the latter emits an output pulse lasting time $\Delta t_1$ with a leading edge corresponding exactly to the change in state of one of signals 20a or 20b, as can be seen in the chronogram in FIG. 5.

The signals applied to the second inputs 45 and 46 of the two logic gates 43 and 44 at the intermediate points between the resistors (47 and 48) and the capacitors (49 and 50) are also applied by connections 56a and 56b to the input of two memories (52a and 52b).

The output signal a from the logic gate (51) controls a monostable stage (53) which delivers at 34a a pulse lasting time $\Delta t_2$ defined by the value of resistor 54 and of capacitor 55 which form part of the conventional type elements of the monostable circuit (53) (signal d in FIG. 5).

Memories 52a and 52b are identical and we shall simply describe the component parts of memory 52a; the identical parts of memory 52b bear the same reference numbers with the suffix b. The input signal 20a is applied to memory 52a through connection 56a. This signal is applied to an inverting amplifier (57a) and also to the first input of a logic gate (58a) performing the NAND function, the second input of which receives the output pulse d from the monostable circuit (53). A second logic gate (59a) also performing the same NAND function receives the output from the inverting amplifier (57a) on its first input and pulse d on its second input. The output from logic gate 58a feeds the first input of a third logic gate 60a also performing the NAND function, the second input of which is connected to the output of a fourth logic gate 61a also performing the NAND function. The fourth logic gate receives the output from the third logic gate 60a on its first input and the output from the second logic gate 59a on its second input.

Under these conditions it can be seen that the change from a low state to a high state in signal 20a first of all causes no change in the state of the output signal b from memory 52a, pulse d appearing as soon as the change occurs to the output of the monostable circuit 53 thus blocking the state change of signal b. On the other hand when duration $\Delta t_2$ ends signal b changes state at time $t_3$ as can be seen in FIG. 5.

The same is true for memory 52b, the output signal c of which changes state at time $t_4$ when the delay period $\Delta t_2$ is up.

In the final analysis it can be seen in FIG. 5 that through this circuit the transition edges of signals 20a and 20b at times $t_1$ and $t_2$ respectively corresponding to an electric gear change signal are transmitted with a delay $\Delta t_2$ to the power interfaces 36a and 36b.

Figure 6:
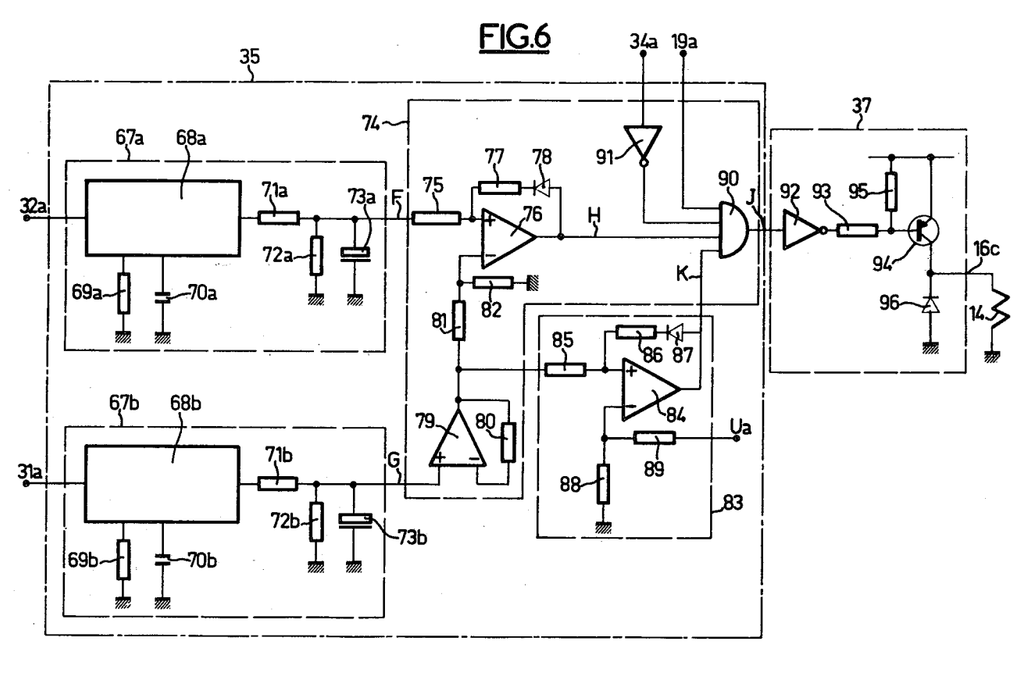
FIG. 6 schematically shows a first embodiment of the speed comparison unit of the electronic control device of the invention.

The power circuits 36a and 36b are identical and of classic construction. In FIG. 6 they have been given the same reference numbers with suffix a or b added. The output signal b from memory 52a is applied at the input of circuit 36a to an inverting amplifier 62a. The output from this amplifier is connected through resistor 63a to the base of a PNP type power transistor (64a) comprising a load resistor 65a and with the collector connected to the circuit ground. The emitter of the power transistor (64a) connected to the supply voltage by the protection diode (66a) feeds the coil of the electrovalve of the electrohydraulic transducer (13a) via connection 16a. The output signal C from memory 52b is similarly applied, after passing through the power circuit 36b, to the electrovalve of the electrohydraulic transducer 13b.

The various components of units 34 and 36 allow each gear change sequence to first of all comprise a change order at times $t_1$ or $t_2$ immediately leading via connection 34a to a "debridging" command. Then, after a transient time $\Delta t_2$, the gear change takes place at times $t_3$ and $t_4$ respectively. A new "bridging" operation can then be performed, since signal d has come back to the low level.

FIG. 6 illustrates a first version of the comparison unit (35). The rectangular signals (31a and 32a) respectively corresponding to the rotational speed of the applied shaft and output shaft are input to the comparison unit 35 and respectively supply two frequency/voltage converters (67a and 67b) of identical construction and bearing the same reference numbers with suffix a or suffix b attached respectively. The purpose of the two converters (67a and 67b) is to convert each speed signal into a continuous voltage (F, G) proportional to the frequency of the input signals 31a and 32b. The frequency/voltage converter 67a comprises a monostable circuit 68a which supplies a pulse whose duration is controlled by resistor 69a and capacitor 70a each time a positive transition is present at its input. Integration of these pulses by resistors 71a and 72a and capacitor 73a supplies the desired continuous voltage F. In the same way converter 67b supplies continuous voltage G.

These voltages supply the input to module 74, the function of which is to provide a "bridging" command at its output J when the speed ratio $V_T/V_M$ is greater than or equal to the limiting value i corresponding to the A coupling point in FIG. 1. To this end the voltage signal F corresponding to the rotational speed $V_T$ of the converter output shaft is integrally applied via resistor 75 to the positive input of a comparator (76) comprising a resistor (77) and a diode (78) in its feedback loop which enables a slight hysteresis or lag to be applied facilitating operating stability and enabling any interference to be dealt with. The negative input of comparator 76 receives a fraction i of voltage G via a buffer stage comprising an amplifier 79 fitted with a negative feedback resistor (80) and a voltage dividing bridge formed by resistors 81 and 82 which define the value of factor i.

The output H from the comparator (76) therefore changes to the high state when the potential on the positive input of the comparator (76) is slightly higher than the potential on the negative input, which corresponds to a situation in which the speed ratio $V_T/V_M$ exceeds factor i.

The comparison unit (35) also comprises a safety circuit (83) which provides for all "bridging" to be prohibited below a certain limiting value of the rotational speed $V_M$ of the input shaft or engine speed. This safety circuit comprises a comparator (84) which receives the voltage from amplifier 79, corresponding to the rotational speed of the input shaft $V_M$, on its positive input via resistor 85. Resistor 86 and diode 87 are installed in the feedback loop of comparator 84 in order to provide a certain hysteresis to the safety threshold of the limiting input speed thus preventing any instability in the system. The input speed limiting value is represented by the reference voltage applied to the negative input of the comparator (84) and its value is determined by resistors 88 and 89 as well as by a fixed reference voltage Ua.

A logic gate (90) performing the AND function receives on its various inputs: the output signal H from the comparator (76) supplying the "bridging" command; via inverting amplifier 91 the output signal 34a from the timing unit (34) supplying a "debridging" command; the signal 19a corresponding to the shift to reverse drive; and the output signal K from comparator 84 of the safety circuit (83). The output J from the AND gate (90) is therefore only in the high state if all its inputs are in the high state as well. In these conditions output J will be in the high state if all the following conditions are fulfilled simultaneously;

the vehicle reverse drive contact is not actuated, which corresponds to an item of data on connection 19a in the high state;

no "debridging" command is present which corresponds to the low level of signal d on terminal 34a and to the high level on the output of inverter 91;

the converter input speed or engine speed $V_M$ exceeds the safe speed defined by circuit 83;

the speed ratio $V_T/V_M$ has reached value i corresponding to the converter coupling point.

Signal J constituting the "bridging" command feeds the power stage (37) the structure of which is standard. Thus signal J is applied to the input of an inverting amplifier (92) which feeds through resistor 93 to the base of a PNP power transistor (94) comprising a load resistor (95) and connected via its emitter to the circuit supply voltage and via its collector to connection 16c feeding the coil of the electrohydraulic transducer (14) electromagnet with protection diode 96 inserted and connected to ground.

It will be noted that in the illustrated example the electrohydraulic transducer (14) is of such a construction that if the electrovalve control coil is not energized it allows the hydraulic fluid to flow through. As we saw when studying FIG. 3 this large flow through the transducer (14) releases the control piston (28), the converter being in the conversion phase.

On the other hand, when a signal supplies the electrovalve control coil, the transducer prevents any hydraulic fluid from passing through and this fluid can only flow through restricto 24 (FIG. 3), thus leading to "bridging" of the converter. The electrovalve of the transducer (14) can be implemented by means of a ball of magnetic material subjected to the effect of an electromagnet coil and capable of moving inside a cavity so as to selectively block off the flow of hydraulic fluid.

Figure 7:
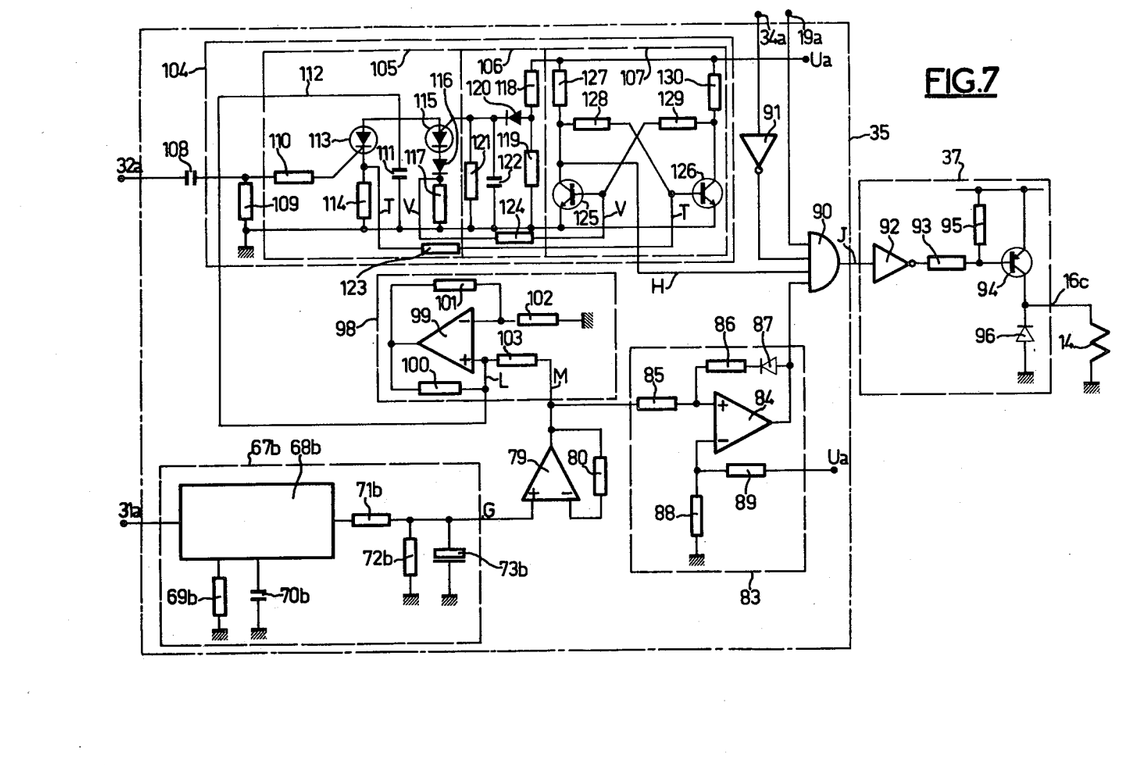
FIG. 7 shows schematically a second embodiment of the speed comparison unit of the electronic control device of the invention.

In the embodiment version shown in FIG. 7 identical elements bear the same reference numbers. In this embodiment of the comparison unit (35), signal 31a corresponding to the speed $V_M$ of the converter input shaft is processed in the same way by the frequency/voltage converter (67b), whilst the output signal from this converter is also applied to the input of amplifier 79 acting as a buffer. We also have here the safety circuit (83) and the AND logic gate (90) which delivers at its output the "bridging" signal J applied to the same power stage 37. In this variant, however, and in order to increase the control speed, the signal representing the output shaft speed $V_T$ and appearing on terminal 32a is processed differently.

The means for processing this signal comprise a current generator (98) and a period meter (104). The current generator is made up of an operational amplifier (99) working with the resistor (100) of the feedback loop, the resistor (101) of the negative feedback loop and the resistor (102) mounted between the negative input and the ground of the circuit. The output voltage M of amplifier 79 is applied via resistor 103 to the positive input of amplifier 99.

The current that is on terminal L connected to the positive input of amplifier 99 is therefore proportional to voltage M, i.e. to the input shaft speed $V_M$. This current is applied to the input of the period meter (104).

The period meter (104) has already been partially described in U.S. Pat. No. 3,403,587 issued Oct. 1, 1968 and entitled "Control Devices Acting as a Function of Frequency And of at Least One Auxiliary Parameter" which may be referred to for further details. The period meter (104) consists of a time comparator/generator (105), a threshold generator (106) and a bistable multivibrator (107).

The time comparator/generator (105) compares the period of signal $V_T$ corresponding to the output shaft speed appearing at terminal 32a after differentiation by capacitor 108 and resistors 109 and 110 with the duration of a signal self-generated by unit 105, which signal is proportional to the voltage value supplied by the threshold generator (106) and inversely proportional to the intensity L supplied by the current generator (98).

The time comparator/generator (105) is made up of capacitor 111 which charges through connection 112 receiving the current L from the current generator (98). The capacitor (111) can quickly discharge through two different paths:

the first path consists of the high holding current thyristor (113) which must discharge capacitor 111 through resistor 114 and the circuit ground each time the branch circuit sends a short time pulse via resistor 110 to the trigger of transistor 113.

the second path consists of the low holding current programmable unijunction transistor (115) which discharges capacitor 111 through diode 116, resistor 117 and the circuit ground each time the capacitor (111) charge voltage reaches the energizing voltage determined by the elements of the threshold generator (106) which sets the gate potential of the unijunction transistor (115).

The threshold generator (106) consists of a voltage divider formed by resistors 118 and 119 the mid-point of which is supplied by diode 120 providing the temperature compensation to the energizing threshold, the unijunction transistor gate (115) which returns to ground via resistor 121 and capacitor 122 which enables short energizing voltage variations due to the accidental presence of parasitic pulses on the gate of the unijunction transistor (115) to be eliminated.

Depending on whether or not the period of the signal appearing on the input terminal 32a allows the capacitor (111) charge voltage to reach the energizing threshold of the unijunction transistor (115), a short high amplitude positive pulse appears on one or other of resistors 114 and 117 and is sent to one or the other control paths T or V of the bistable multivibrator (107) via resistors 123 and 124.

The multivibrator (107) of conventional construction, is made up of two NPN transistors (125 and 126) and resistors 127, 128, 129 and 130. The bistable multivibrator (107) memorizes the result of the comparison until the next period. The bistable multivibrator (107) is so connected that transistor 126 remains blocked and the other transistor (125) saturated when the period of signal 32a corresponding to the converter output shaft speed is greater than the duration of the reference signal obtained when the charging voltage of capacitor 111 reaches the energizing threshold of the unijunction transistor (115). Such a configuration leads to a low level for output H from the bistable multivibrator (107). Otherwise this output remains at the high level.

The output signal J from the logic gate 90 is applied as in the variant in FIG. 6 to the power interface (37) which enables the electrohydraulic transducer (14) to be controlled.

Finally an electronic control device is obtained by means of which the transmission converter can be "bridged" for all forward drive ratios of the transmission. Moreover, the electronic device comprises the safety systems prohibiting "bridging" either when the transmission is in the rear drive ratio or when the engine speed is below a certain threshold for which "bridging" would lead to stalling the engine.

The electronic device of the invention enables "bridging" to be eliminated and a time delay to be implemented at each change up and down in the transmission ratios thus permitting changeovers between the different transmission ratios without any shocks. Moreover, "bridging" is carried out according to this invention in accordance with the ratio between the converter input and output speeds, i.e. taking into consideration the most characteristic parameters of actual operation of the converter.

Finally, the device of the invention is designed so that in the case of one or other of the speed sensors failing the converter is in the torque conversion phase with any "bridging" being prohibited. Thus, if the output shaft speed sensor supplies no indication the speed ratio controlling the device of the invention is zero so that "bridging" is not possible. If, on the other hand, the input shaft rotational speed sensor is faulty it is the safety circuit numbered 83 which prohibits any "bridging" from taking place.

We claim:

1. A control system for controlling the engaging and disengaging of the clutch of a hydrodynamic torque converter in an automatic transmission having at least two forward gear ratios, each gear ratio being established in response to receipt by the automatic transmission of a shift signal generated by an electronic ratio controller, said system comprising:
   means for generating a first signal indicative of the input speed to the torque converter;
   means for generating a second signal indicative of the output speed of the torque converter;
   a comparator responsive to the comparison of the first signal and the second signal for generating a control signal when that comparison exceeds a preset value;
   timing means responsive to the generation of the shift signal for generating an inhibiting signal of a predetermined time duration and applying the shift signal to the automatic transmission after said predetermined time duration has elapsed;
   output means responsive to the presence of the control signal and the absence of the inhibiting signal for providing an output signal; and
   clutch control means responsive to the presence of said output signal for causing engagement of the clutch and responsive to the absence of said output signal for causing disengagement of the clutch.

2. In an automatic transmission having at least two forward gear ratios, a hydrodynamic torque converter with a hydraulically controlled clutch, and means for establishing a gear ratio in the transmission in response to a receipt by the automatic transmission of a shift signal generated by an electronic ratio controller, the improvement comprising:
   means for generating a first signal indicative of the input speed to the torque converter;
   means for generating a second signal indicative of the output speed of the torque converter;
   a comparator for generating a control signal when comparison of the second signal and the first signal indicates that the ratio of the torque converter output speed to the torque converter input speed exceeds a predetermined value;
   timing means responsive to the generation of the shift signal for generating an inhibiting signal of a predetermined time duration and for applying the shift signal to the automatic transmission after said predetermined time duration has elapsed;
   output means responsive to the presence of the control signal and the absence of the inhibiting signal for providing an output signal; and
   clutch control means responsive to the presence of said output signal for causing engagement of said clutch and responsive to absence of said output signal for causing disengagement of said clutch.

3. The invention of claim 1 or 2 in which said clutch control means comprises electrohydraulic clutch control means mounted in a hydraulic fluid circuit of said clutch and responsive to the presence of said output signal to provide a first clutch passage for decreasing fluid pressure within said clutch and responsive to the absence of said output signal to provide a second fluid passage smaller than the first fluid passage for increasing fluid pressure within said clutch.

4. The invention of claim 1 or 2 in which said output means comprises an AND gate responsive to simultaneous presence of the control signal and absence of the inhibiting signal for generating the output signal.

5. The invention of claim 1 or 2 in which said timing means comprises responsive to the generation of the shift signal for generating a pulse of a pre-set duration, and a memory unit for storing the shift signal and applying the shift signal from said memory means to the automatic transmission after termination of the pulse.

6. The invention of claim 1 or 2 in which said first signal generating means comprises means for generating a first pulse signal having a frequency indicative of the torque converter input speed; said second signal generating means comprises means for generating a second pulse signal having a frequency indicative of the torque converter output speed; and said comparator comprises a first frequency/voltage converter for converting the first pulse signal to a first voltage signal having a voltage level indicative of the frequency of the first pulse signal, a second frequency/voltage converter for converting the second pulse signal to a second voltage signal having a voltage level indicative of the frequency of the second signal, a multiplier for providing a third voltage signal which is a multiple of one of the first and second voltage signals, and a comparison circuit for comparing the third voltage signal with the other one of the first and second voltage signals.

7. The invention of claim 6 in which each of said frequency/voltage converters comprises a monostable multivibrator and a voltage integrator.

8. The invention of claim 6 in which said comparator further comprises a safety circuit responsive to the first voltage signal for inhibiting said output means from applying the output signal when the first voltage signal indicates that the torque converter input speed is below a preset speed.

9. The invention of claim 1 or 2 in which said first signal generating means comprises means for generating a first pulse signal having a frequency indicative of the torque converter speed; said second signal generating means comprises means for generating a second pulse signal having a frequency indicative of the torque converter output speed; and said comparator comprises a frequency/voltage converter for converting the first pulse signal to a voltage signal having a voltage level indicative of the frequency of the first pulse signal, a current generator responsive to the voltage signal for generating a current signal indicative thereof, and a period meter for comparing the frequency of the second pulse signal with a pulse signal of a frequency related to the current signal.

10. The invention of claim 9 in which said frequency/voltage converter comprises a monostable multivibrator and a voltage integrator.

11. The invention of claim 9 in which said comparator further comprises a safety circuit responsive to the voltage signal for inhibiting said output means from applying the output signal when the first voltage signal indicates that the torque converter input speed is below a preset speed.

12. A method for controlling the engaging and disengaging of the clutch of a hydrodynamic torque converter in an automatic transmission having at least two forward gear ratios, each gear ratio being established in response to receipt by the automatic transmission of a shift signal generated by an electronic ratio controller, said method comprising:

sensing the input speed of the torque converter;

sensing the output speed of the torque converter;

comparing the torque converter output speed with the torque converter input speed;

engaging the clutch in response to the ratio of the torque converter output speed to the torque converter input speed exceeding a predetermined value;

sensing the generation of the shift signal; and in response to generation of the shift signal disengaging the clutch and a predetermined time after generation of the shift signal applying the shift signal to the automatic transmission.

* * * * *